June 18, 1929.   S. LANKHEET   1,717,697
BRAKE ACTUATING MECHANISM
Filed March 19, 1928   2 Sheets-Sheet 2
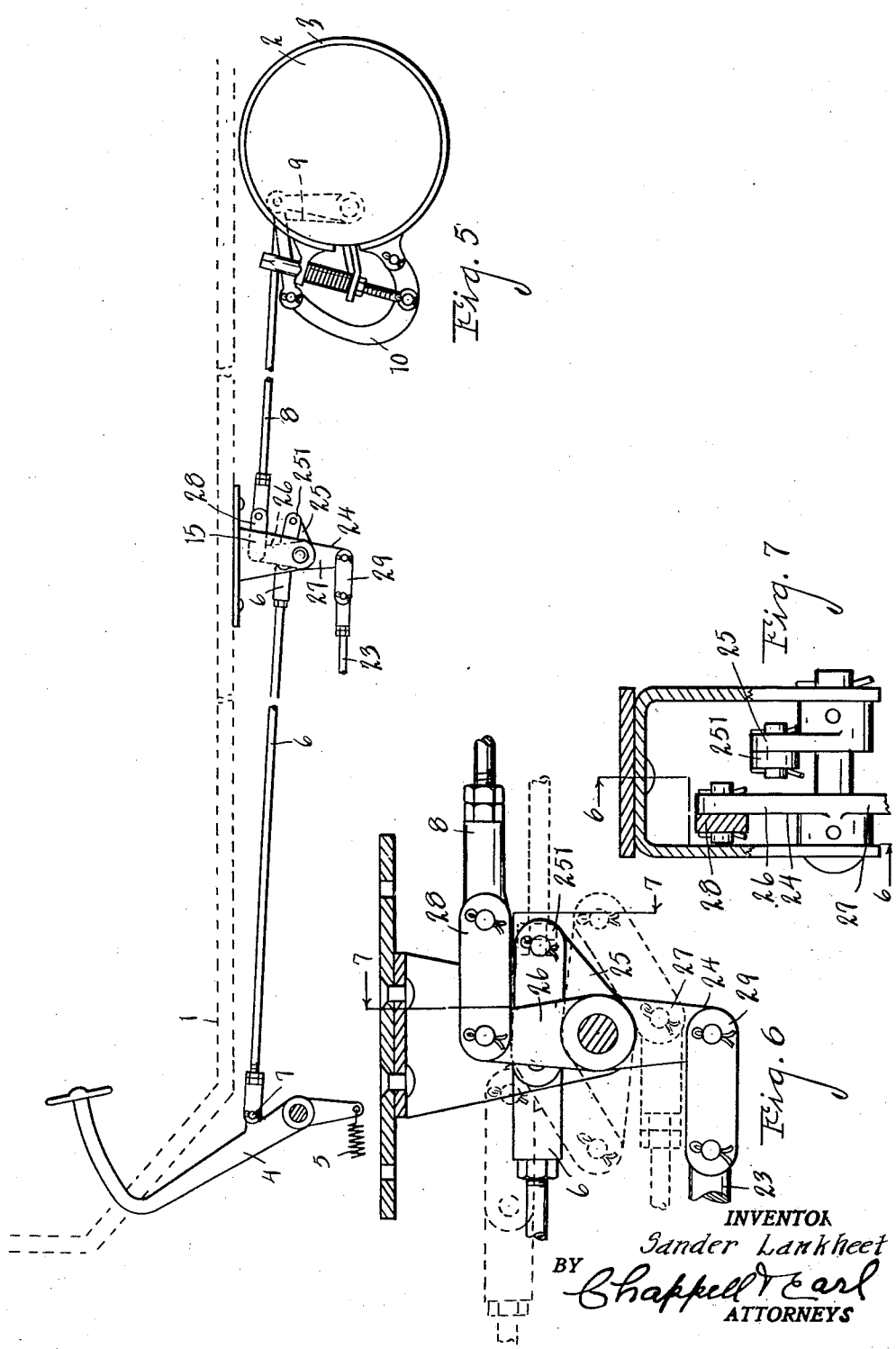
INVENTOR
Sander Lankheet
BY Chappell & Earl
ATTORNEYS Patented June 18, 1929.

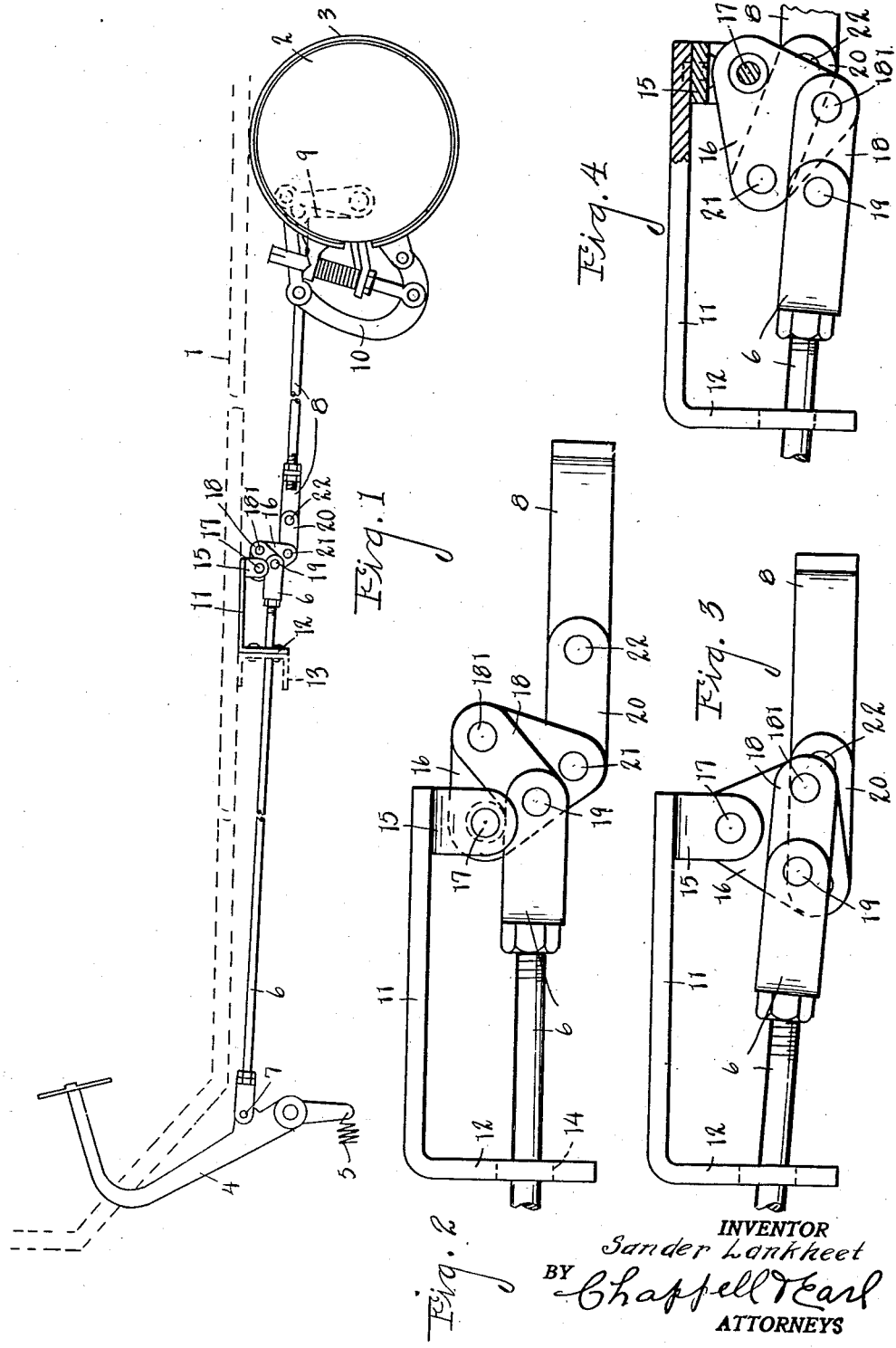

1,717,697

UNITED STATES PATENT OFFICE.

SANDER LANKHEET, OF HOLLAND, MICHIGAN, ASSIGNOR OF ONE-HALF TO HENRY G. PELON, OF HOLLAND, MICHIGAN.

BRAKE-ACTUATING MECHANISM.

Application filed March 19, 1928. Serial No. 262,920.

The main objects of this invention are:

First, to provide an improved brake actuating mechanism by means of which the power applied to the pedal or actuating lever is greatly multiplied or increased.

Second, to provide a brake actuating mechanism in which during the first portion of the stroke of the actuating lever the slack in the brake and the connections is quickly taken up and during the latter portion of the stroke there is a substantial increase in power.

Third, to provide a brake actuating mechanism embodying these advantages which is simple, strong and durable in structure and readily embodied in motor vehicles of types and structure now in general use.

Objects pertaining to details and economies of my invention will definitely appear from the description to follow. The invention is defined in the claims.

A structure embodying the features of this invention is clearly illustrated in the accompanying drawing forming a part of this application, in which:

Fig. 1 is a fragmentary side elevation of a mechanism embodying the features of my invention, Fig. 2 is an enlarged detail side elevation of parts of my brake actuating mechanism in normal position.

Fig. 3 is a detail side elevation of the parts shown in Fig. 2 showing the parts in an intermediate position.

Fig. 4 is a fragmentary detail view showing the parts in approximately fully actuated position.

Fig. 5 is a fragmentary side elevation of a slightly modified form of my invention illustrating an adaptation to a four-wheel brake vehicle.

Fig. 6 is a detail vertical section on line 6—6 of Fig. 7, the parts being shown in different actuated positions by dotted lines.

Fig. 7 is a detail view partially in section on line 7—7 of Fig. 6.

Referring to the drawing, 1 represents a portion of a motor vehicle chassis, 2 a brake drum and 3 a brake band. 4 represents the brake pedal which is held in normal position by a spring 5. The actuating rod 6 is connected to the brake pedal at 7 while the actuated rod 8 is connected to the arm 9 of the brake shoe toggle designated generally by the numeral 10.

On the chassis I mount a hanger 11 having an attaching arm 12 secured to the cross sill 13. The cross sill and arm have a hole 14 through which the rod 6 is disposed. The hanger has spaced depending ears 15. Between these ears I mount a bell crank lever 16 preferably in the form of a triangular plate as shown in Figs. 1 to 4, inclusive. The supporting pivot 17 is arranged through this plate at one angle or corner thereof. This plate-like lever is so proportioned as to provide a lever having long and short arms.

The actuating rod 6 is connected to the short arm of the lever by the link 18, the link being pivoted to the lever at 181 and to the connecting rod at 19. This permits the swinging of the pivot 181 to approximately the horizontal plane of the lever supporting pivot 17, as shown in Fig. 2, which is the normal position of the parts, the link swinging on the pivot 19 after the link 18 has engaged the lever pivot 17.

The actuated rod 8 is connected to the long arm of the lever 16 by means of the link 20 which is pivoted to the lever at 21 and to the connecting rod at 22. In normal position as shown in Figs. 1 and 2 the link 20 is parallel with the rod 8. When the foot pedal or lever 4 is actuated the pivots 181 and 19 swing downwardly, traveling away from the pivot of the lever 16, whereas the pivots 21 and 22 swing upwardly traveling toward the pivot 18 until the link 20 comes into engagement with the lever pivot when the movement of the pivot 22 is checked. The pivot 21, however, is still permitted to travel upwardly to approximately the horizontal plane of the pivot 17.

The result of this is that during the early portion of the stroke of the actuating lever, the slack in the connections and in the brake is rapidly taken up, and during the latter part of the stroke there is a gradual increase in power delivered, this continuing to the limit of the stroke owing to the connection described.

My improved brake mechanism is very powerful, is simple in structure and economical in its parts.

In the modification shown in Figs. 5, 6 and 7 I show an adaptation of my mechanism to a four-wheel brake, a second actuated rod 23 corresponding to the rod 8 being provided. In this embodiment the power lever designated generally by the numeral 24 has three arms 25, 26 and 27. The actuating rod 6 is connected to the arm 25 by means of a link 251 while the actuated rods 8 and 23 are connected to the arms 26 and 27 by means of the links 28 and 29, respectively.

In Fig. 6 I illustrate the parts in initial position by full lines and in fully actuated position by dotted lines.

I have not illustrated and described other adaptations and embodiments which I contemplate as I believe this disclosure will suggest such embodiments and adaptations to those skilled in this art.

Having thus described my invention what I claim as new and desire to secure by Letters Patent is:

1. In a brake mechanism, the combination with the brake and an actuating lever, of an operating connection for said lever to said brake comprising a hanger, a bell crank lever having arms of different lengths pivotally mounted on said hanger, an actuating rod connected at one end to said actuating lever, a link connecting the other end of said rod to the short arm of said bell crank lever permitting the pivot connecting the link to the short arm of said lever to swing to an approximately horizontal position with the connecting rod in engagement with the bell crank lever pivot, an actuated rod connected at one end to said brake, and a link connected to the other end of said rod and to the long arm of said bell crank lever permitting the pivot connecting said second link to said bell crank lever to swing to a plane approximately in the horizontal plane of the bell crank lever pivot and with said actuated rod connecting link in engagement with said bell crank lever pivot.

2. In a brake mechanism, the combination with the brake and an actuating lever, of an operating connection for said lever to said brake comprising a hanger, a bell crank lever pivotally mounted on said hanger, an actuating rod connected at one end to said actuating lever, a link connecting the other end of said rod to one arm of said bell crank lever, permitting the pivot connecting the link to the bell crank to swing to an approximately horizontal position with the connecting rod in engagement with the bell crank lever pivot, an actuated rod connected at one end to said brake, and a link connected to the other end of said rod and to the other arm of said bell crank lever permitting the pivot connecting said second link to said bell crank lever to swing to a plane approximately in the horizontal plane of the bell crank lever pivot and with said actuated rod connecting link in engagement with said bell crank lever pivot.

3. An operating connection for brakes comprising a pivoted bell crank lever having arms of different lengths, an actuating rod, a link connecting said rod to the short arm of said lever permitting the pivot connecting the link to the short arm of said lever to swing to approximately the horizontal plane of the lever pivot with the connecting rod in engagement with the lever pivot, an actuated rod, and a link connected to said rod and to the long arm of said lever so that the pivot connecting said second link to said lever may swing to approximately the horizontal plane of the lever pivot with said actuated rod connecting link in engagement with said bell crank lever pivot.

4. An operating connection for brakes comprising a pivoted bell crank lever, an actuating rod, a link connecting said rod to one arm of said lever permitting the pivot connecting the link to the lever to swing to approximately the horizontal plane of the lever pivot with the connecting rod in engagement with the lever pivot, an actuated rod, and a link connected to said actuated rod and to the other arm of said lever so that the pivot connecting said second link to said lever may swing to approximately the horizontal plane of the lever pivot with said actuated rod connecting link in engagement with said bell crank lever pivot.

5. An operating mechanism for brakes comprising a bell crank lever having arms of different lengths, an actuating rod, a link connecting said rod to the short arm of said lever whereby the pivot connecting the link to the lever may swing to approximately the horizontal plane of said lever pivot with the actuating rod below the lever pivot, an actuated rod, and a link connecting said actuated rod to the long arm of said lever permitting the travel of the pivot connected to the lever to approximately the horizontal plane of the lever pivot.

6. An operating mechanism of the class described comprising a bell crank lever having arms of different lengths, links pivotally connected to the arms of said lever, and actuating and actuated elements pivotally connected to said links whereby the links may swing at an angle to the elements to which they are connected when the bell crank lever is at the limits of its stroke and the point of application of power for the actuating element travels away from the lever pivot and that of the actuated element travels toward the lever pivot.

7. An operating mechanism for brakes comprising a bell crank lever, an actuating element, a link connecting said element to one arm of said lever whereby the pivot connecting the link to the lever may swing to approximately the horizontal plane of said lever pivot at one end of the stroke of the lever, an actuated element, and a link connecting said actuated element to the other arm of said lever permitting the travel of the pivot connected to the lever to approximately the horizontal plane of the lever pivot at the other end of the stroke of the lever.

8. An operating mechanism of the class described comprising a bell crank lever, links pivotally connected to the arms of said lever, and oppositely disposed actuating and actuated rods pivotally connected to said links whereby the links may swing at an angle to the rods to which they are connected when the bell crank lever is at the limits of its stroke and the point of application of power to the lever travels away from the horizontal plane of the lever pivot and that of the delivery of power travels toward the horizontal plane of the lever pivot.

9. An operating mechanism of the class described comprising a bell crank lever, oppositely disposed actuating and actuated rods and links pivotally connecting said rods to the arms of said lever whereby the links may swing at an angle to the rods when the lever is at either end of its stroke.

10. An operating mechanism of the class described comprising a bell crank lever, actuating and actuated elements operatively connected to the arms of said lever, the connection for one of said elements to the lever being a link permitting continued movement of the lever after the element has engaged the lever pivot.

11. An operating mechanism of the class described comprising a bell crank lever, actuating and actuated elements operatively connected to the arms of said lever, the connection for one of said elements to the lever being a link permitting continued movement of the lever after the link has engaged the lever pivot.

In witness whereof I have hereunto set my hand.

SANDER LANKHEET.